Feb. 2, 1937.   W. E. TAYLOR   2,069,290
SORTING AND COUNTING DEVICE
Filed May 18, 1928    10 Sheets-Sheet 1
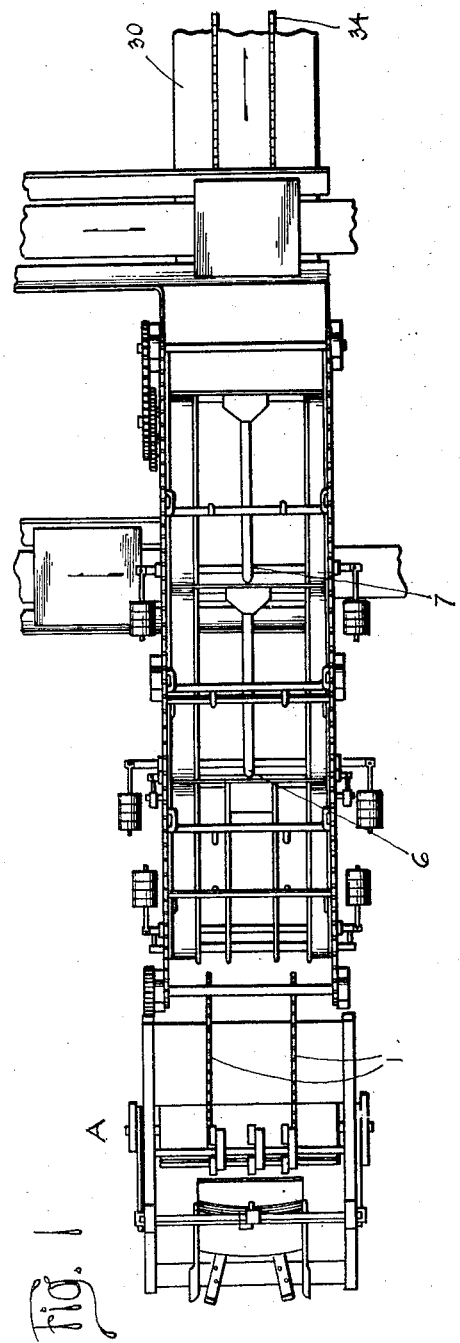
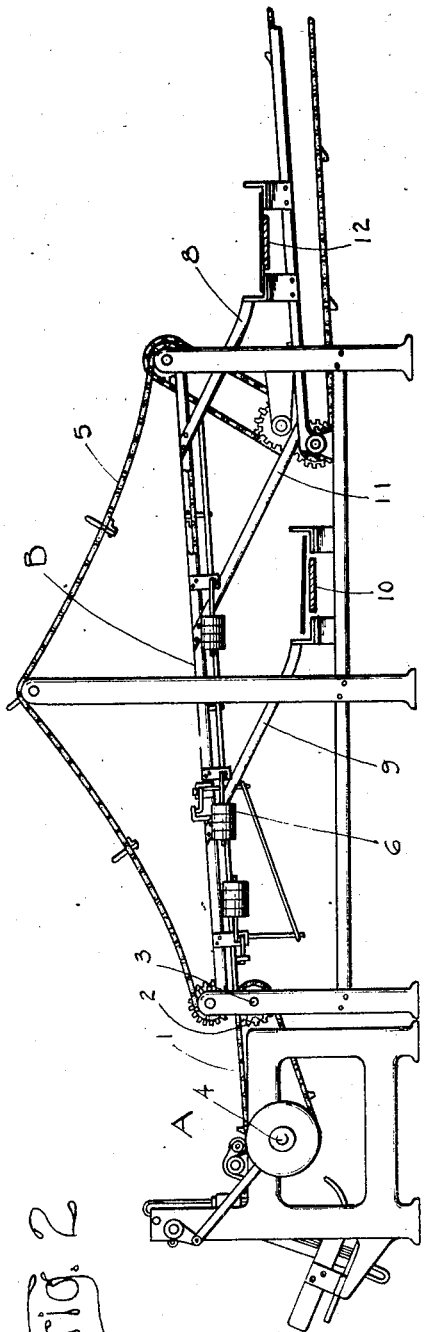
INVENTOR
William E. Taylor
BY John C. Carpenter
ATTORNEY

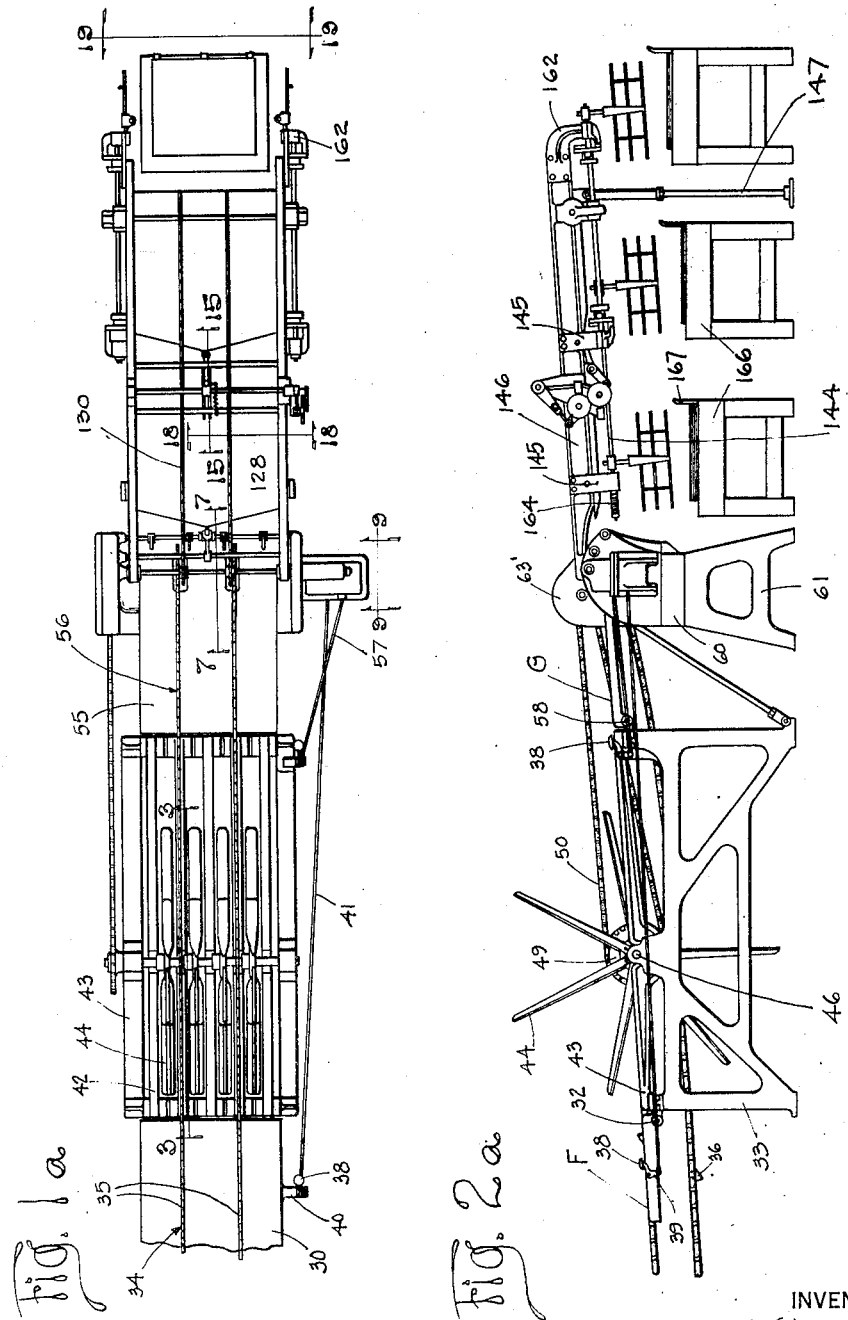

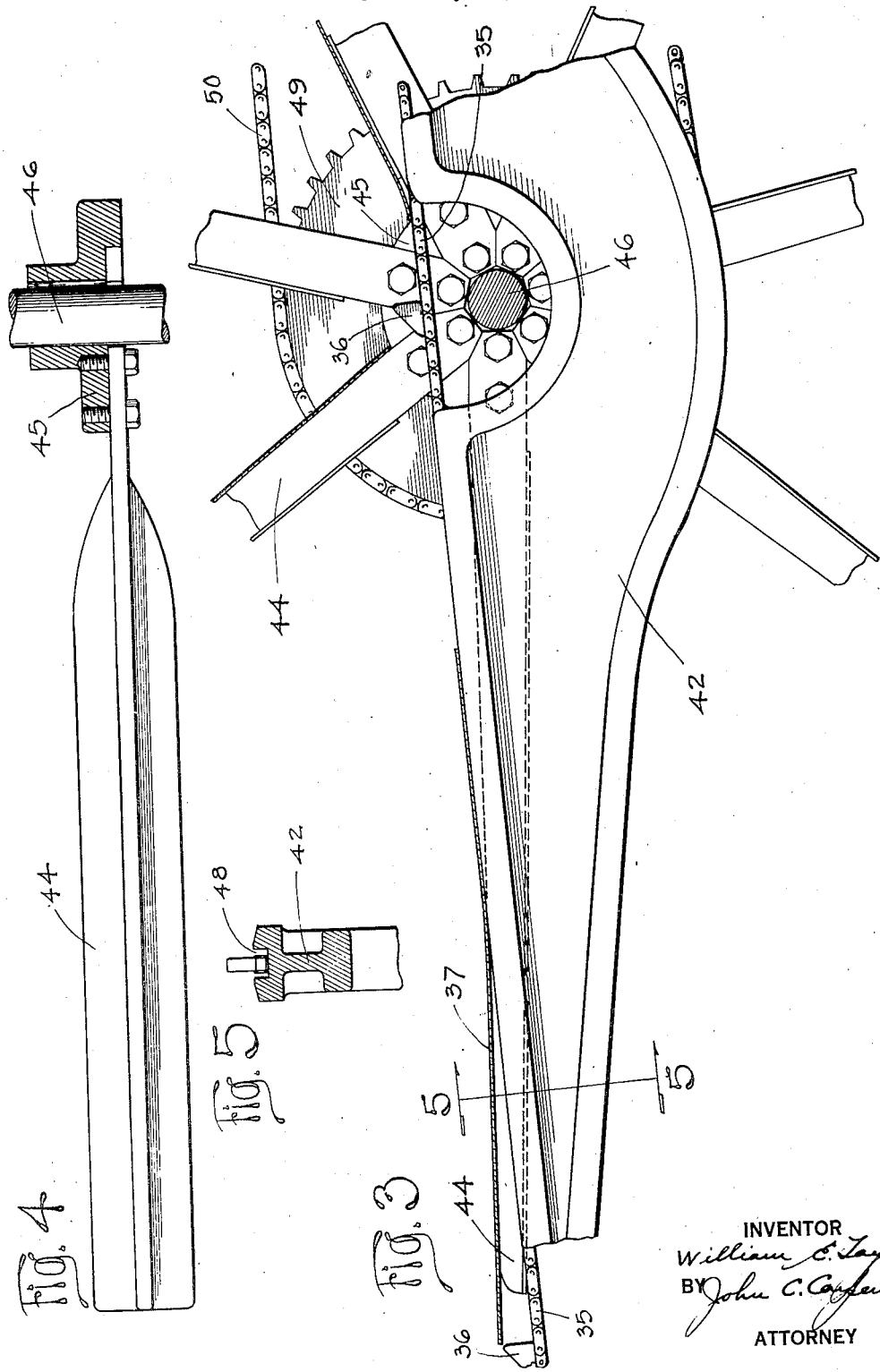

Feb. 2, 1937.  W. E. TAYLOR  2,069,290
SORTING AND COUNTING DEVICE
Filed May 18, 1928   10 Sheets-Sheet 4
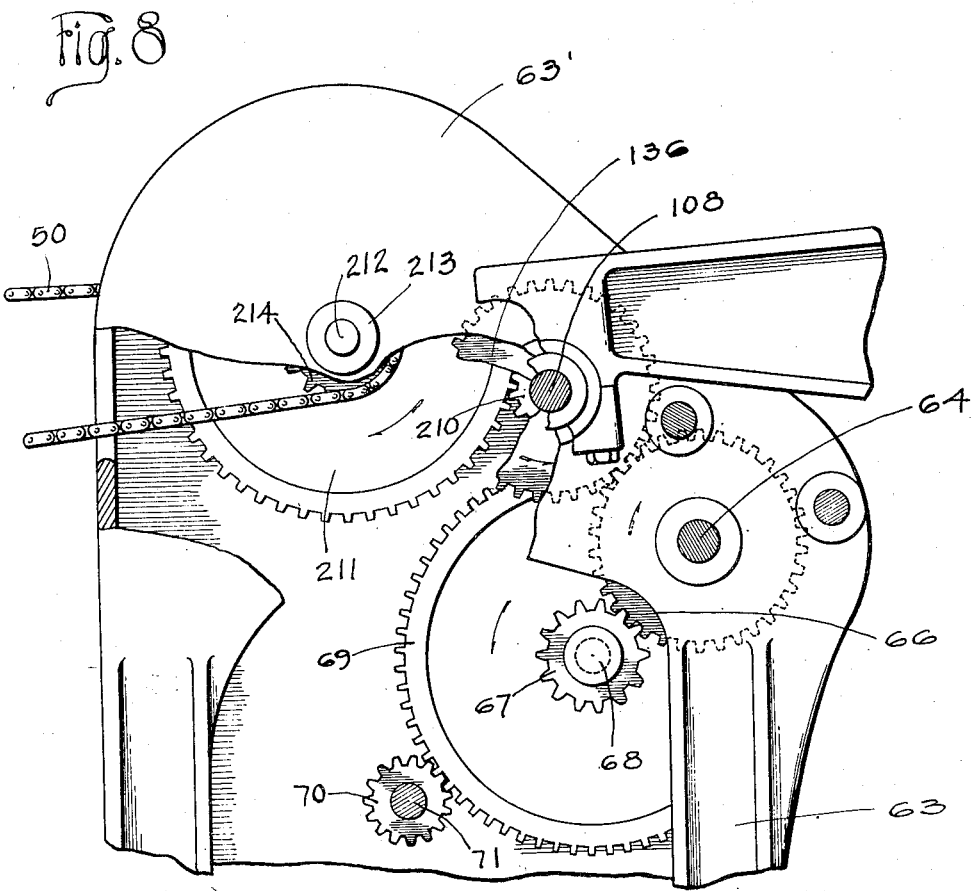
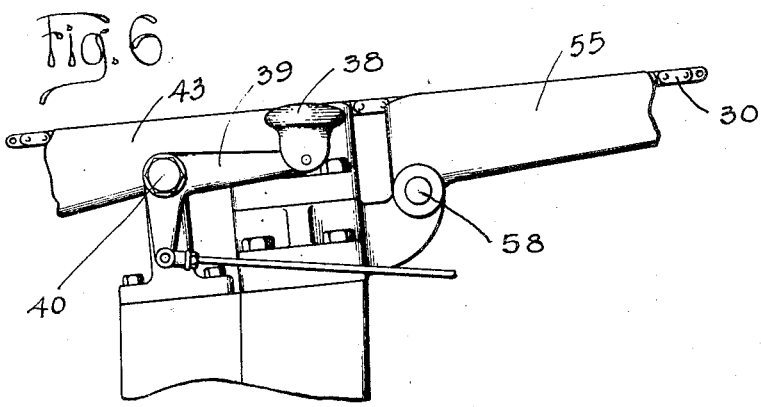
INVENTOR
William E. Taylor
BY John C. Carpenter
ATTORNEY

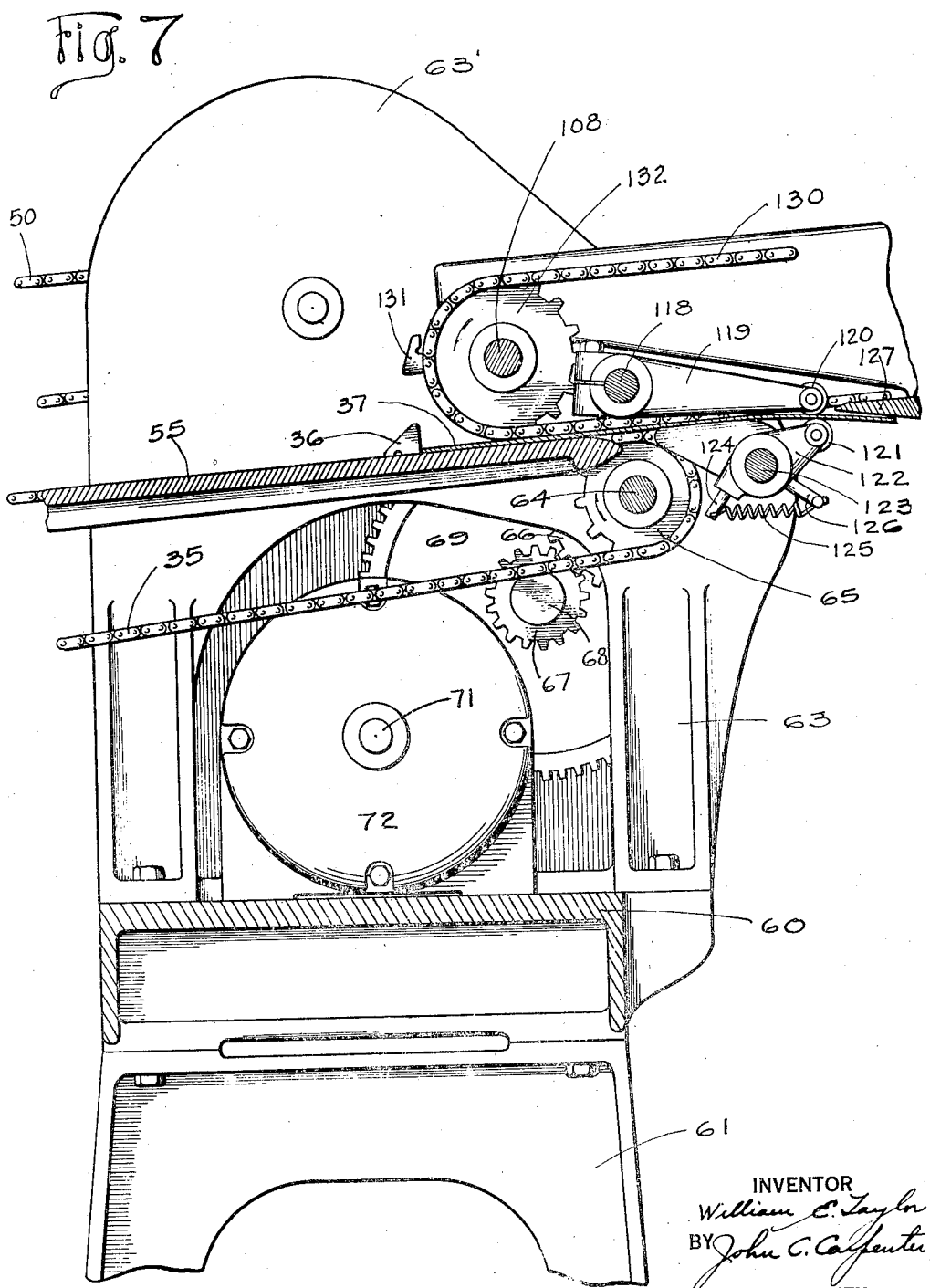

Feb. 2, 1937. W. E. TAYLOR 2,069,290
SORTING AND COUNTING DEVICE
Filed May 18, 1928 10 Sheets-Sheet 6

INVENTOR
William E. Taylor
BY John C. Carpenter
ATTORNEY

Feb. 2, 1937. W. E. TAYLOR 2,069,290
SORTING AND COUNTING DEVICE
Filed May 18, 1928 10 Sheets-Sheet 7
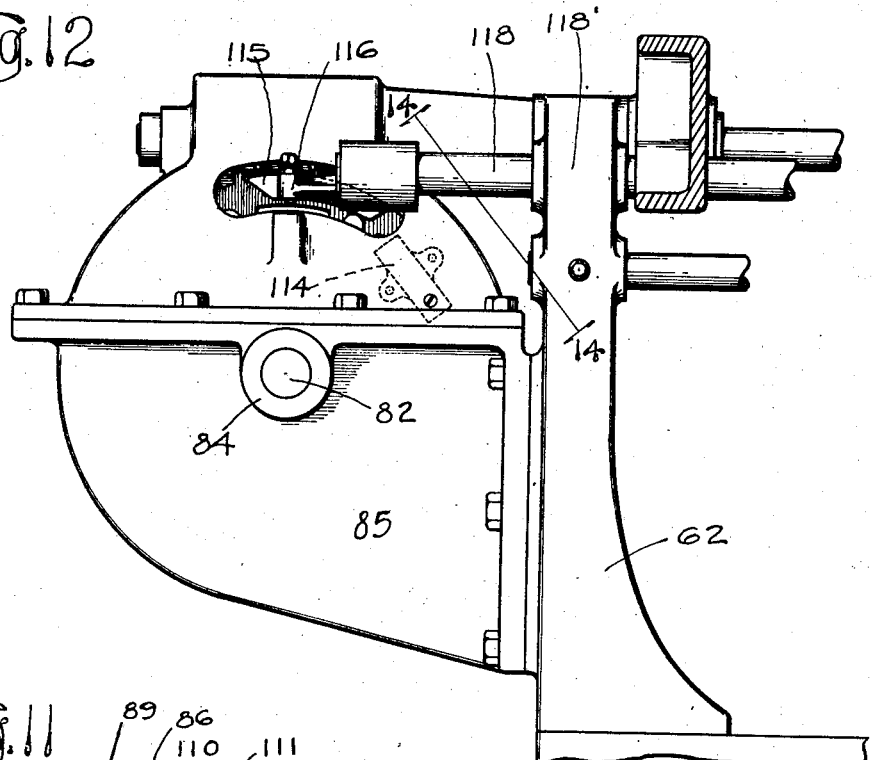
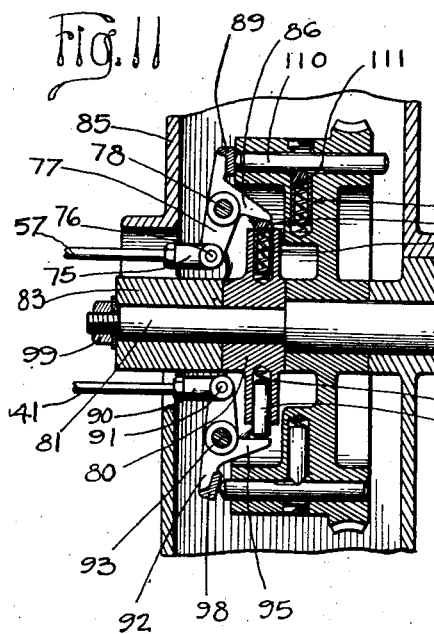
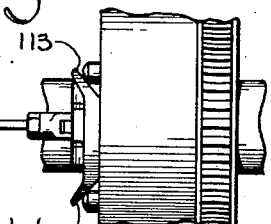
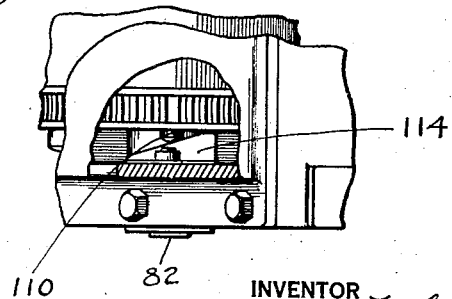
INVENTOR
William E. Taylor
BY John C. Carpenter
ATTORNEY

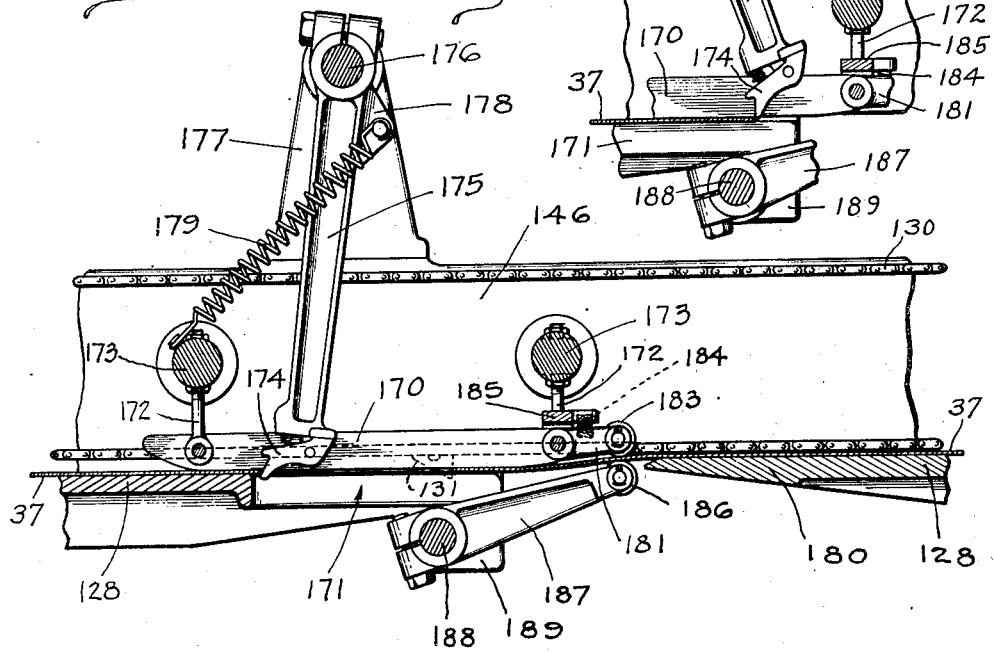
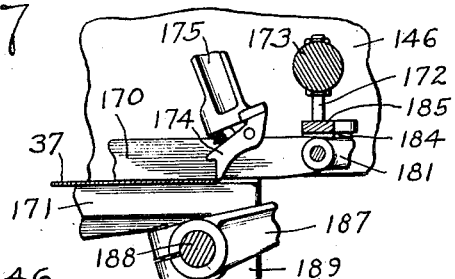
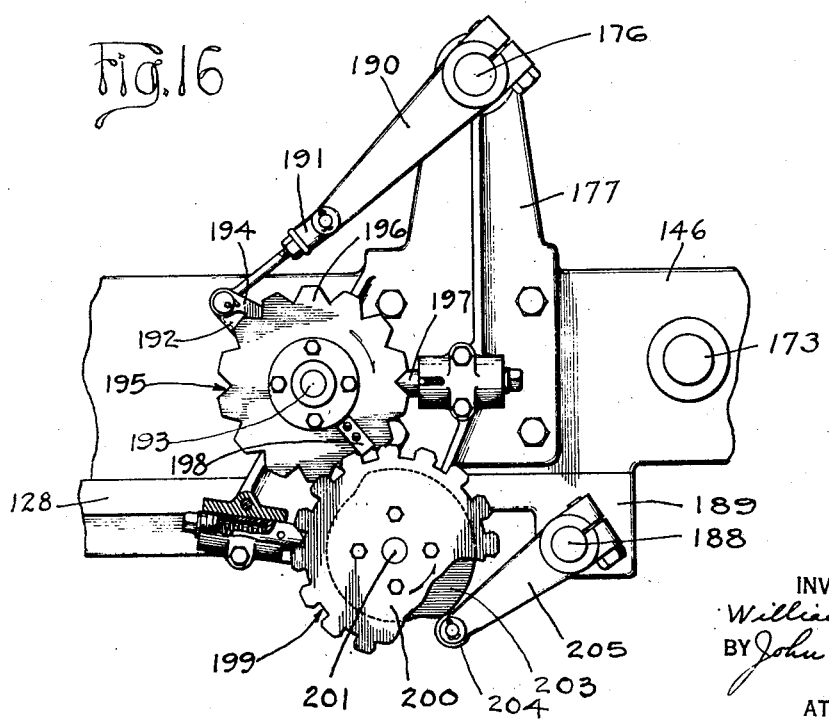

Feb. 2, 1937.  W. E. TAYLOR  2,069,290
SORTING AND COUNTING DEVICE
Filed May 18, 1928   10 Sheets-Sheet 9
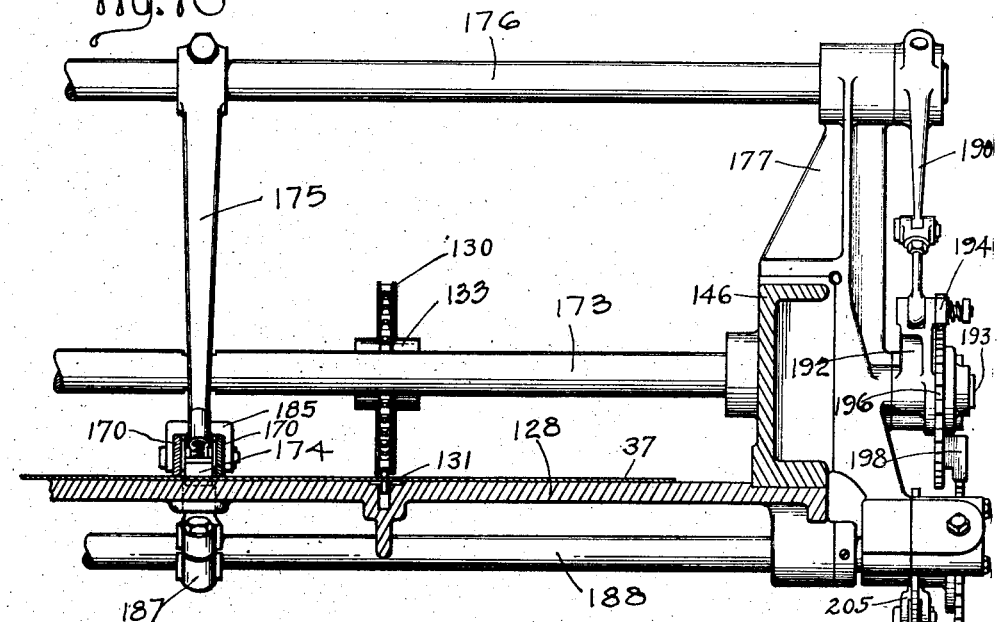
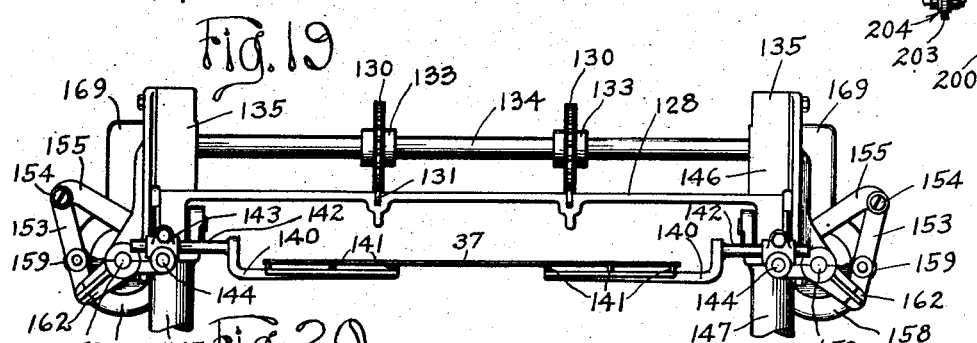
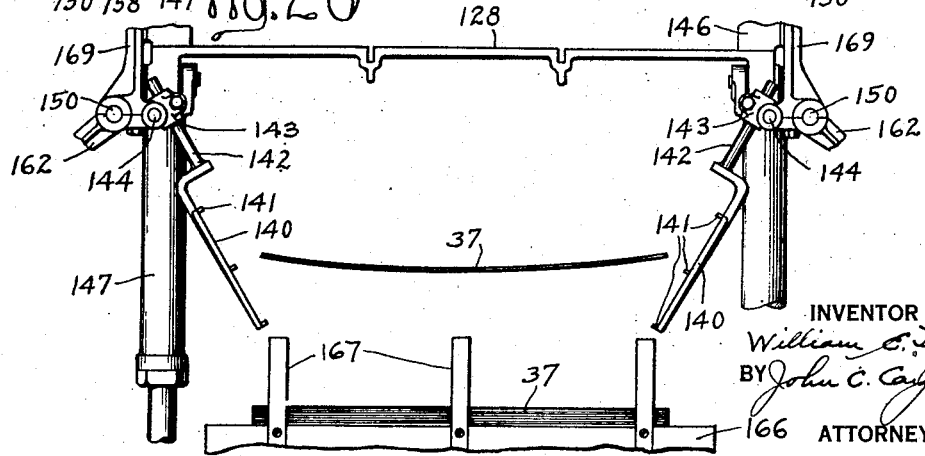
INVENTOR
William E. Taylor
BY John C. Carpenter
ATTORNEY

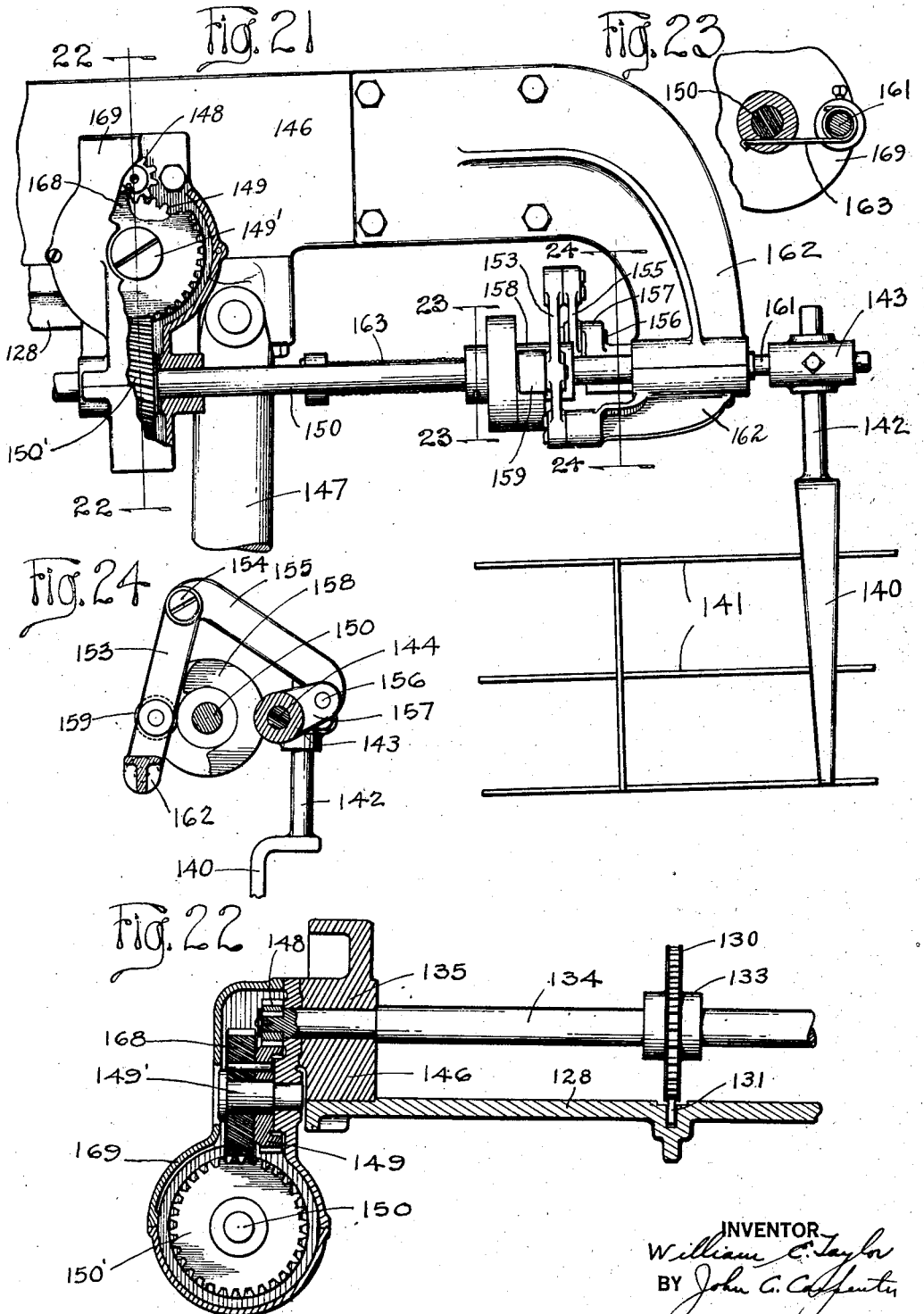

Patented Feb. 2, 1937

2,069,290

UNITED STATES PATENT OFFICE 2,069,290

SORTING AND COUNTING DEVICE

William E. Taylor, East Orange, N. J., assignor to American Can Company, New York, N. Y., a corporation of New Jersey Application May 18, 1928, Serial No. 278,813

12 Claims. (Cl. 93—93)

My invention relates to a machine for handling sheets of tin plate whereby both over and under-weight sheets will be sorted from the sheets of proper weight and these last mentioned sheets thereafter be given a visual inspection on both sides and if found defective on such inspection will be rejected. The invention contemplates further the stacking of the perfect sheets into lots of predetermined number.

It is an object of this invention to provide a machine whereby sheets of metal may be readily visually inspected on both sides.

A further object of the invention is the provision of a machine which will permit of the ready separation and separate disposal of sheets found to be defective upon inspection.

Another object of the invention is the provision of a mechanism which will minimize the work of inspection by confining it to sheets earlier determined to be of proper gauge and weight.

Another object is to provide an efficient mechanism to accomplish the automatic rejection and stacking of defective sheets.

Another object is to provide a machine which will automatically count and stack sheets which have passed inspection into lots of predetermined size.

Another object is to provide a novel and efficient mechanism to accomplish this counting and stacking.

A still further object is to provide suitable stacking devices whereby the stacks will be formed in such a manner that the individual sheets are in approximate alinement.

Numerous other objects and advantages of the invention will be apparent as it is better understood from the following description, which, taken in connection with the accompanying drawings, discloses a preferred embodiment thereof.

In general, the machine comprises a weight sorting mechanism for separating over-weight and under-weight sheets from those of normal weight and also a series of visual inspection tables over which the metal sheets are passed, there being means placed between successive tables to turn the sheet over so that a different side is presented at each table. After the sheets have passed the inspection tables, they are either removed from the machine as defective or stacked into lots of predetermined size, which latter operation constitutes the means of counting perfect sheets passing through the machine. The removal of imperfect sheets takes place through the medium of certain machinery designed for that purpose, acting under the control of inspectors at the various inspection tables.

Inasmuch as this device is particularly well adapted to the handling of sheets of tin plate in a tin mill, the counting mechanism is arranged to count into each stack what is known as a box of tin plate, which always comprises 112 sheets. It should be evident, however, after the invention is completely understood, that this number is only arbitrary and that any number may be obtained by using a proper gear ratio associated with the counting mechanism.

Referring to the drawings:

Figure 1 is a top plan view of a portion of the apparatus embodying my present invention, being that portion in which the weight sorting is accomplished;

Fig. 1ª is a similar view of the remainder of the views, Figs. 1 and 1ª together constituting a complete plan view;

Fig. 2 is a side elevation of so much of the apparatus as is shown in Fig. 1;

Fig. 2ª is a side elevation of so much of the apparatus as shown in Fig. 1ª;

Fig. 3 is a fragmental sectional detail of a portion of the turn-over device, the view being taken substantially along line 3—3 of Fig. 1ª;

Fig. 4 is a top plan view of one of the blades of the turn-over device as shown in Fig. 3;

Fig. 5 is a cross-sectional detail of a portion of the chain support frame, the section being taken along line 5—5 of Fig. 3;

Fig. 6 is an elevational detail of one of the trip devices or remote controls, which are operated by the inspectors to set the mechanism for controlling the sheet after it has passed the inspection of the two operators. The particular device shown is for the second operator but substantially the same mechanism is used in connection with the trip device for the first operator;

Fig. 7 is a cross-sectional detail of the throw-out device, being taken substantially along line 7—7 of Figure 1ª;

Fig. 8 is a partial elevation, partial section of the gear connected with the throw-out device, and the control mechanism for the same, the view being similar to that shown in Fig. 7. Fig. 8 also shows the gearing for driving all of the parts of the machine;

Fig. 11 is a cross-sectional detail of the throw-out mechanism showing the detailed operation of the trip control, being taken substantially along line 11—11 of Fig. 10;

Fig. 12 is a side elevation of the device shown in Fig. 9, viewed from the right hand side of that figure;

Fig. 13 is a partial top plan of the device shown in Fig. 11;

Fig. 14 is a partial plan, partly broken away, taken along line 14—14 of Fig. 12 and illustrates the cam action returning portions of the throw-out control device to an inoperative position;

Fig. 15 is a cross-sectional detail of the transfer and counting mechanism located just in advance of the first discharge point for perfect sheets, being taken substantially along line 15—15 of Fig. 1;

Fig. 16 is an elevation of the device shown in Fig. 15, showing the counting mechanism in detail;

Fig. 17 is a fragmental detail of the parts illustrated in Fig. 15, these parts being shown in a different position;

Fig. 18 is a cross-sectional detail taken along line 18—18 of Fig. 1, showing a portion of the mechanism illustrated in Figs. 15 and 16;

Figs. 19 and 20 illustrate different positions of the sheet receiving discharge and stacking mechanism, the views being end elevations of the machine taken substantially along line 19—19 of Figure 1a;

Fig. 21 is an enlarged detail, partially broken away, of one of the stacking mechanism showing the controls for the same;

Fig. 22 is a cross-sectional detail taken along line 22—22 of Fig. 21, being another view of the driving mechanism for the stacking devices;

Fig. 23 is a sectional detail of a portion of the stacking mechanism taken along line 23—23 of Fig. 21, and Fig. 24 is a fragmental detail of the same stacking device taken along line 24—24 of Fig. 21.

Referring in detail to the drawings, wherein the same numerals designate the same parts throughout the machine, for the purpose of clear description the machine has been roughly divided into the following sections, and a description will be made in general according to this classification.

Figure 9:
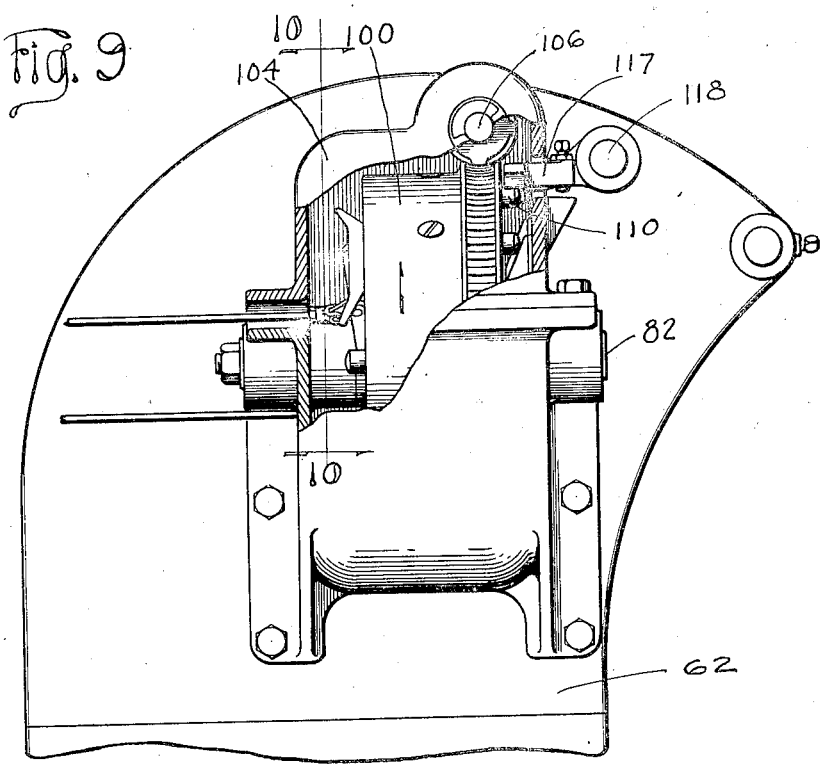
Fig. 9 is a front elevation, partially broken away of the sheet throw-out control device, taken substantially along line 9—9 of Fig. 1ª.
Figure 10:
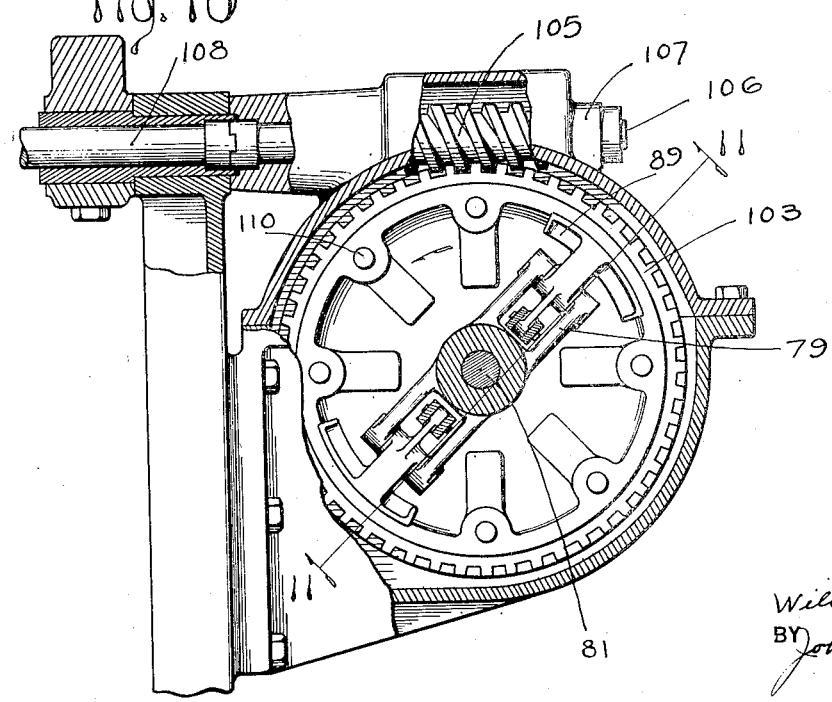
Fig. 10 is a side elevation, partially broken away and partially in section of the devices illustrated in Fig. 9, the view being taken substantially along line 10—10 of Fig. 9.

Referring now to the sheets of the drawings containing Figs. 1 and 2 and 1a and 2a, and considering Figs. 1 and 1a as a single view in plan, and Figs. 2 and 2a as a single view in elevation, it will be noted that a sheet stack-holder, generally indicated at A, is provided at the lefthand end of the machine. This holder may be a part of a stacking device as hereinafter explained. The sheets are singly moved from this holder for transfer to a weight sorting mechanism, generally indicated at B, wherein they are sorted into three groups, those in the first group being delivered out of the machine at C; those in the second group being carried forward on a conveyor D; and those in the third group being delivered out of the machine at E. The sheets delivered at C, i. e. at the first delivery station, are those sheets which are over-weight, and because of their weight have dropped down from the normal path of the sheet travel. The sheets delivered at D are those of normal and proper weight and they have also been moved down and forward through the apparatus by the conveyor D. The sheets delivered at E are those of too light weight and because of this light weight have passed the stations sorting out the sheets for delivery at C and D. The sheets carried by the conveyor D are moved on toward the right and passed to inspection tables, respectively indicated at F and G, between which is located a turn-over device indicated at H. Beyond the inspection tables are arranged sorting and stack-mechanisms in other divisions.

It should be understood that this classification only gives a rough division of the various parts, and necessarily there will be a considerable lapping over of the various subdivisions as one set of mechanism operates upon or is controlled by mechanism in other divisions.

*Sheet conveying and weight sorting mechanism*

Referring now to Figs. 1 and 2 of the drawings, the sheet stacking device indicated generally at reference character A is or may be that described and claimed in application for United States Letters Patent, Serial No. 717,853, for improvements in Blank feed mechanism, invented by James A. Gray, and particular description of this automatic sheet stacking device will not here, therefore, be undertaken. The sheets are removed from this stacking device and conveyed by two conveyor chains 1 taking over sprockets 2 on shafts 3 and 4. These conveyor chains 1 deliver the sheets to a counting and weighing mechanism which sorts them in accordance with their weight and, as earlier described, this mechanism being that indicated at B. This weighing mechanism is or may be that described and claimed in United States Letters Patent No. 1,649,231 of John M. Hothersall, for Tin plate weighing machine. It may be mentioned that the chains 5 convey the sheets past weight trip devices 6 and 7 and to (when the sheets are of too light weight) a chute 8. The weight trip device 6 is actuated when a sheet too heavy in weight passes it and sheets of this character move down a chute 9 to a cross conveyor 10 for outside delivery. Sheets of normal and intended weight are too light to actuate the weight trip device 6 but are heavy enough to actuate the weight trip device 7 and then move down a chute 11 to a conveyor 34 moving over a table 30 to the inspection stations. If a sheet be too light in weight, it actuates neither the trip 6 nor 7 and passes on to the chute 8 down which it slides and to a conveyor 12 for external delivery.

*Inspection tables and turn-over device*

There are two inspection tables provided, and a turn-over device is located between them, whereby opposite sides of the sheets are presented for the visual inspection at the different tables. These tables and the turn-over device are illustrated in Figures 1a, 2a, 3, 4 and 5. A control device for each table, regulating the rejection of imperfect sheets, is shown in Fig. 6. The two inspection tables are indicated by reference characters F and G and are flat tables slightly inclined to the horizontal, as is, indeed, the whole machine, the height increasing as the sheet progresses through the machine. The first table 30 is connected at 32 to the frame 33 of the turn-over device. One end of the second table 55 is hingedly supported, as at 58, to the adjacent end of the frame 33, its other end resting within the sorting device. Each table has two grooves 34 and 56 cut therein, running longitudinally thereof. These grooves are adapted to contain a pair of endless conveyor chains 35, the chains proper lying entirely within these grooves. Each chain 35 is provided with a plurality of spaced lugs 36 extending above the flat surface of the tables, the lugs on each chain registering with those of the other. At each table a handle 38 is provided, mounted upon one end of a bell crank 39, pivoted to the table or frame, as at 40, the other arm of the crank connecting to a rod 41 or 57, the rod 41 reaching from the first table and the rod 57 reaching from the second table. These rods are connected at their other ends to devices accomplishing the automatic rejection of imperfect sheets, which will be described later.

The turn-over device located between the two inspection tables comprises a supporting frame 33, carrying side bars 43 and spaced-apart center rails 42 (Fig. 5) extending longitudinally of the device, two of these center rails having grooves 48 to receive the conveyor chains 35. A shaft 46 is mounted in suitable bearings in the side rails 43, and it is to be noted that this shaft is positioned below the conveyor chains 35. This shaft is driven by a sprocket 49, carried by it at one end, which is actuated by a chain 50 (Fig. 3), the chain and sprocket rotating the shaft. Intermediate its ends, the shaft 46 carries a number of spiders, each comprising a plurality of blades 44 (Fig. 4) secured to a collar 45, the blades of the spiders being in registration and rotating between the center rails 42 (Fig. 1a).

In operation a sheet to be inspected is placed upon the first inspection table by any suitable means, where it is engaged by a pair of lugs 36 and advanced over the table. As the sheet 37 moves into the turn-over device, it is caught by the blades 44 of the rotating spiders and lifted out of engagement with the lugs 36, as clearly shown in Fig. 3. As the blades raise toward a vertical position, the sheet slides down against the collars 45 and remains there until the blades pass a vertical position, when it falls to the back of the next proceeding set of blades to be lowered to the center rails. It should be noted that the rotation and the movement of the conveyor chains are synchronized and by the time the sheet reaches the opposite center rails, the lug 36 has advanced to again engage the sheet. Since the spiders rotate relatively slowly, the sheet is clear of the spiders by the time a set of blades are ready to pass through between the center rails. The sheet is then carried over the second inspection table and into the sorting mechanism. By combining the turn-over means to operate only on selected sheets of proper weight, I obtain less and better superficial inspection of the sheets.

*Sorting mechanism and controls*

The sorting mechanism for the rejection of imperfect sheets is relatively simple and is shown in Figs. 7, 9 and 12. The control mechanism for the sorting mechanism is somewhat more intricate, being clearly shown in Figs. 9, 10, 11, 12, 13 and 14.

As a sheet 37 is advanced beyond the second inspection table, it comes into the influence of the sorting mechanism engaging between two rollers 120 and 121. The roller 121 is mounted upon a lever 122 which is journalled upon a fixed stud 123. This lever has a projecting arm 124, which is engaged by a tension coil spring 125, the other end of which is fastened to a bracket 126, the stud 123 and bracket 126 being secured to a gear casing or bracket 63' to be described later. The spring continuously urges the lever to rotate in a counter-clockwise direction, as seen in Fig. 7.

The roller 120 is mounted in a lever 119, which is secured to a rock shaft 118, journalled in suitable bearings 118' on a bracket 62. A lever 117 is secured upon one end of the shaft 118 and carries at its end a block 116, one face of which forms a cam 115, the action of which will be presently described. Under the action of the spring 125, the two rollers are normally positioned to cause the sheet 37 to pass above a tapered portion 127 of a table 128, this being the path of travel of perfect sheets. If a sheet has been found defective, the cam 115 is actuated to cause the two rollers 120 and 121 to be moved downwardly and so project the sheet beneath the table 128 to be discharged from the machine.

It is well to note at this point that this and subsequent discharge points open downwardly and it becomes necessary to have a conveyor above the sheets instead of below them. To this end, a pair of chains 130 are provided, these chains having lugs 131, similar to the lugs 36 on chains 35, the chain 130 being driven from a sprocket 132 mounted upon a shaft 108 and synchronized with the movement of the chains 35.

The control means for causing the operation of the levers 119 and 122 comprises means for moving the cam 115 and the devices associated with the said control means to cause it to operate. A drum 100 is mounted for rotation upon a stub shaft 82, which is held in bearings 83 and 84 in a housing 85, which is bolted to a bracket 62. The drum has a worm pinion 103 at its periphery adapted to engage a worm 105 mounted upon a shaft 106 carried in bearings 107 formed in a housing cap 104, the shaft 106 being positively secured to and driven by the drive shaft 108. By this means the drum is given a constant rotation synchronized with the action of the remainder of the operating machinery. The rim portion of the drum is relatively thick and carries a number of spaced-apart pins 110 extending parallel to its axis of rotation, the pins being slidable between an operative and an inoperative position. Each pin is held in place in either position by spring-pressed detents 111 operating in radial slots 112 formed in the web of the drum. When in the inoperative position, one end of the pins 110 extends from the back face of the drum, and when in the operative position the other end extends from the front face of the drum in a position which will cause them to actuate the cam 115 previously described. A cam block 114 is provided to return the pins from an operative to an inoperative position after they have passed the cam 115. The shaft 82 also carries a collar 80, which has a pair of diametrically opposite bifurcated arms 79, the said collar being mounted upon a portion 81 of the shaft 82 which has a reduced diameter, the major portion of the collar lying within the drum, a nut 99 serving to permit adjustment of the collar and to hold it in place. A lever 77 is mounted on one of these arms to rotate on a pin 78, a similar lever 98 being mounted upon a pin 93 on the opposite arm. The lever 77 has a projection 86 which engages a barrel 87 which surrounds a coil spring 88 in a radial slot formed in the collar 80, and an extending arm 89 positioned adjacent the edge of the rim of the drum 100 at its rear face. Due to the action of the spring 88, this extending arm is normally held away from the face of the drum. This extending arm 89 is elongated so as to cover a considerable arc on the face of the drum, each end of the elongation being beveled to form cam faces 113. As shown clearly in Fig. 13, this portion of the lever 77 will just fit between two adjacent pins without actuating either, so that a slight rotation of the drum is sufficient to bring one of the pins 110 under the action of the lever 77 when the elongated portion is held against the face of the drum.

The lever 92 is in all respects similar to lever 77, having a projection 95 engaging a barrel 96 and spring 97 in a radial slot in the collar 80 and having an enlarged portion 98 adapted to engage and move the pins 110.

The lever 92 is attached to rod 41 previously described by a link 90 and a pin 91, while the lever 77 is connected to rod 57 by a link 75 and pin 76. It should be noted that the rod 41 extends back to connect to a bell crank and handle at the first inspection table and that the rod 57 extends back to a similar connection at the second inspection table.

In operation, suppose the first inspector notes a defect in a sheet passing over the first table. He depresses the handle 38 at his station and so actuates the rod 41. This will cause the lever 92 to rotate about the pin 93 against the action of the spring 97 and bring the arm 98 into contact with a pin 110 near the bottom of the drum 100, thus causing the pin to move and project from the front face of the drum. The sheet moves on through the turn-over device and over the second inspection table as described. By this time the drum 100 is rotated sufficiently to bring the same pin into the area adjacent the arm 89 of the lever 77. If the second inspector observes a defect, he depresses the handle 38 at his station, actuating the rod 57 and causing the lever 77 to rotate about the pin 78 and bring the arm 89 against the rear face of the drum, but this pin has already been moved by the arm 98 of the lever 92 and accordingly is not further actuated. As the sheet moves forward, the drum continues to rotate and just before the sheet reaches the rollers 120 and 121 the pin 110, associated with that particular sheet, actuates the cam 115 and by the described actions therewith causes the lever 119 and the rollers 120 and 121 to be depressed and thus discharge the sheet from the machine. As the pin passes from the cam 115, it comes in contact with the cam block 114 which returns the pin to an inoperative position where it is again ready to receive actuation from the arms on the levers 77 and 92. From this it can be easily seen how a defective sheet is automatically rejected from the machine if either inspector or both finds a defect in the sheet. However, if neither inspector observes a defect, the pin associated with that particular sheet is not moved and accordingly the pin passes the cam 115 without acting upon it, and since the levers 119 and 122 with their rollers 120 and 121 remain in a raised position, the sheet will pass on to be stacked and counted as perfect.

Driving mechanism

Inasmuch as the driving mechanism is closely associated with the sorting mechanism and its controls, the driving mechanism will now be described and is shown in detail in Figs. 7 and 8 and partially in Figs. 9 and 12.

The driving and sorting mechanisms are supported by a suitable frame 61 carrying a table 60 thereon, brackets 62, 63 and 63' being secured to the table. A motor 72, having an armature shaft 71, is mounted upon the table 60 and is thus out of the way. The armature shaft 71 carries a pinion gear 70 which meshes with a reducer pinion 69 mounted upon a shaft 68 journalled in the bracket 63, the shaft carrying a small pinion 67. This pinion 67 meshes with a second reducer gear 66 which drives a shaft 64 also journalled in brackets 62 and 63. This shaft 64 carries sprockets 65 which drive the conveyor chains 35 which operate over the inspection tables. The reducer gear 66 also meshes with a gear 136, which is secured to and drives the shaft 108, the shaft 108 carrying sprockets 132 which drive the conveyor chains 130 operating over the counting table 128 and also being connected to the shaft 106 which is the drive shaft for the drum 100. A small gear 210 is also mounted on the shaft 108 and meshes with a reducer gear 211 mounted upon a stub shaft 212 journalled in bearings 213 in the bracket 63', the shaft 212 carrying a sprocket 214 which drives the chain 50 to rotate the spiders in the turnover device.

Counting device

As has been explained, the counting device operates by directing a given number of sheets through one discharge port, then closing that port and directing the same number to a second port and then reopening the first port, etc. The counting device of my invention is illustrated in Figs. 15, 16, 17 and 18. As the perfect sheets pass from the sorting device they move over a counting table 128 supported by side rails 146, one end of which rests within the sorting and control portion of the machine, the other being supported by legs 147. A discharge port 171 is provided at approximately the center of the table 128, the second port being at the end of the table, the counting device being located adjacent the port 171. The port 171 and the end of the table I term exits from the table. As the sheet advances, it passes beneath a rider 170 which extends over the port 171, the rider being firmly supported by rods 172 which depend from cross rods 173 extending between the side rails 146. A spring-pressed dog 174 is positioned in the path of the advancing sheet so that the dog must be moved as the sheet is moved. This dog is attached to one end of a lever 175, which is secured to a rock shaft 176 journalled in brackets 177 fastened to the side rails 146. This lever 175 has an arm 178 to which is attached a coil spring 179, the other end of the spring being fastened to one of the cross rods 173 in such a manner that the spring resists movement of the lever and constantly urges it in a clockwise direction, as seen in Fig. 15. As the sheet continues its travel, a position is reached at which the dog is released, thus allowing the lever 175 to move under the action of the spring 179, (see Fig. 17). A lever 181, carrying a roller 183, is pivoted to one end of the guide bar 170, and under the action of a coil spring 184 seated in a spring block 185 carried by a support 172 is constantly urged to rotate in a clockwise direction, as seen in Fig. 15. The lever 181 and its roller 183 cooperate with the lever 187 and roller 186, these coming under the influence of the spring 184. The lever 187 is secured to a rock shaft 188, journalled in brackets 189 depending from the side rails 146. These two levers and their rollers are situated in the discharge port 171 just in advance of a tapered portion 180 of the midportion of the table 128 and control the passage of the sheet moving between them, either directing the sheet above or below the tapered portion 180 and thus regulate the flow of sheets to one of two stacks, the position of the lever 187 being regulated by a lever 205 (see Fig. 16) secured to one end of the rock shaft 188. A lever 190 is secured to one end of the rock shaft 176 and is reciprocated by the action of the lever 175 moved by the passing sheets. A link 191 connects the lever 190 to an arm 192 mounted for rotation upon a stub shaft 193, the arm 192 carrying a spring-pressed dog 194 at the end. This dog engages teeth 195 on a disc 196 which is also mounted upon the stub shaft 193. A spring-pressed detent 197 also engages the teeth of the disc 196 and permits the dog 194 to give the disc an intermittent motion in one direction. The disc 196 carries a dog block 198 opposite one of its teeth, the block engaging teeth 199 on a second disc 200 mounted upon a stub shaft 201. Both of these stub shafts 193 and 201 are secured to the side rails 146. A spring-pressed detent engages the teeth of the disc 200, which is given an intermittent motion by the dog block 198, each revolution of the disc 196 advancing the disc 200 by one tooth. A cam 203 is bolted to the disc 200, as shown in Fig. 16, the cam providing a track for a roller 204 mounted at one end of the lever 205 previously described. The cam is made so that it has a raised portion extending substantially around one half of its circumference.

The disc 196 is provided with 14 teeth so that for each revolution 14 sheets have passed through the counting device. The disc 200 has 16 teeth so that for each revolution of the latter disc, 224 sheets have passed through the counting device. Now, since a box of tin plate contains 112 sheets and each stack of perfect sheets is to comprise one box of tin plate, the passage of the sheets to one of the two ports is changed twice with each revolution. This is accomplished by the cam 203. When the roller 204 is riding on the depressed portion of the cam, the levers 181 and 187 are in a lowered position, held there by the action of the spring 184, thus discharging sheets through the port 171. When the roller 204 is riding on the raised portion of the cam, the levers 181 and 187 are in a raised position, directing the sheets to the end of the table 128 for discharge. It can be easily seen that 112 sheets will, therefore, be discharged from each port before a change takes place.

*Stacking mechanism*

The stacking mechanisms are shown in Figs. 1, 2, 19, 20, 21, 22, 23 and 24. While in some respects they are all similar, for certain structural reasons the stacking mechanisms located at the end of the machine are not operated as a unit with the stacking mechanisms at the port 171 and at the point of discharge for imperfect sheets. These latter two operate together and will be described first. Each discharge station is equipped with a pair of gates 140, made up of bars 141, the gates being positioned on opposite sides of the machine. At the first two stations, these gates are connected to a rock shaft 144 by clamps 143 engaging a rod 142 extending from each gate, the clamp allowing for adjustment. It is to be understood that a mechanism is required at each side, but as these are similar a description of one will suffice for both. The rod 144 is journalled in brackets 145, bolted to the side rails 146. A drive shaft 150, journalled in brackets 145 and 162, extends along the side of the machine adjacent and slightly below the discharge table 128 carrying a drive gear 150' intermediate its ends. This drive gear 150' is a spiral gear and meshes with another spiral gear 168 mounted upon a stub shaft 149' held in a bracket 169 attached to a side rail 146. A spur gear 149 is mounted upon the same stub shaft and is rotated with the gear 168, being driven by a pinion gear 148 mounted upon the end of a shaft 134 journalled in bearings 135. This shaft 134 carries sprockets 133 which are driven by the conveyor chain 130. A cam disc 151 is mounted at each end of the drive shaft 150, this cam disc having a raised cam track 158 extending approximately about half its circumference. A lever 153, carrying a cam track roller 159, is pivoted to a bracket 145 or 162 and is connected to a link 155 by a pin 154 at its other end. The link 155 is pivoted to a lever arm 157 by a pin 156, the lever arm being secured to the rock shaft 144. One end of a coil spring 164 is secured to a collar at the end of the shaft 144, the other end being fastened to a bracket 145, the spring being arranged to continuously urge the gates toward a lowered position. The cam mechanism at the end of the table 128 is the same as that just described, except that the lever arm 157 is attached to a shaft 161 journalled in a bracket 162, which carries the last gate. A spring 163 is provided to urge the gate to a lowered position.

In operation, the raised cam track 158 engages the roller 159 and by means of the various linkage causes the gates to be raised to a receiving position in time to take a sheet coming from any of the discharge stations. As the roller disengages the track, the gates acting under the influence of the springs are quickly lowered directing the sheet upon tables 166 provided at each station, the sheet being projected against stops 167 on the tables, thus positioning the sheets in a stack with their edges in approximate alinement.

It is thought that this invention and many of its attendant advantages will be understood from the foregoing description, and it will be apparent that many changes may be made in the form, construction and arrangement of the parts without departing from the spirit and scope of the invention or sacrificing all of its material advantages, the form hereinbefore described being merely a preferred embodiment thereof.

I claim:
1. In a machine for counting and stacking metal sheets and in combination, means for counting perfect sheets passing through the machine and directing said sheets to one of a plurality of discharge points, stacking elements swingable upward and inward and downward at the sides of the machine for receiving and depositing the sheets successively, and means for actuating said stacking elements.

2. In a machine for counting and stacking metal sheets and in combination, a table having a port opening downward therethrough, means for numerating perfect sheets passing thereover and directing a given number of sheets to one of a plurality of discharge points, said means comprising a plurality of dentate discs, and means connected with one disc to arrest the sheets successively at said port and cause the passage of the sheets through said port.

3. In a machine for counting and stacking metal sheets and in combination, means for numerating perfect sheets passing therethrough and, cooperating with said numerating means, devices for directing a given number of sheets to one of a plurailty of discharge points, said devices comprising a plurality of interconnected levers actuated by the passage of said sheets, a plurality of interconnected dentate discs, one of said discs being actuated by one of said levers, and cam means mounted upon the other of said discs to actuate means to control the point of discharge of the sheets from the machine.

4. In a machine for counting and stacking metal sheets and in combination, a table having a port opening downward therethrough, means to receive sheets discharged from the table through said port and to stack said discharged sheets upon suitable receivers, each of said means comprising a plurality of sidewise and vertically swinging gates at the sides of the table, and means to operate and control the position of each gate.

5. In a machine for counting and stacking metal sheets and in combination, a plurality of means to receive sheets discharged from the machine and to stack said discharged sheets upon suitable receivers, each of said means comprising a plurality of vertically swinging gates normally held in inoperative position, springs urging said gates to inoperative position, and continuously operated means to bring said gates into operative position at desired intervals to receive discharged sheets.

6. In a machine for counting and stacking metal sheets and in combination, a table having a port opening downward therethrough, means to receive sheets discharged from the table through said port and to stack said discharged sheets upon suitable receivers, in longitudinal line with the table, and means for counting said sheets prior to the completion of the stacking of the same.

7. In a machine for counting and stacking metal sheets and in combination, a table having a port opening downward therethrough, and means for numerating perfect sheets passing downward therethrough comprising sheet deflectors for directing a given number of sheets to one of a plurality of discharge points.

8. In a sheet counting and stacking mechanism, a fixed table having successive points of exit for sheets, means for propelling a succession of sheets along the table and to said points of exit, sheet directing means at one of said points of exit and engageable by the sheets, said directing means comprising devices to cause the sheets to pass such point of exit to one of a plurality of stacks, stacking means for receiving and stacking the sheets as they pass the point of exit, devices for holding said sheet directing means out of operation to allow the sheets to pass to another exit point and stack, and counting mechanism for the first point of exit and operable when encountered by a sheet, whereby a plurality of stacks are formed, each stack having a desired number of sheets.

9. In a machine for sorting, counting and stacking metal sheets, and having means for continuously advancing such sheets, means for reversing such sheets to provide exposure of opposite faces, means for diverting imperfect sheets from the machine, manual controls for actuating said diverting means on the passage of an imperfect sheet: the combination of means for further advancing said sheets, means for counting perfect sheets passing through said machine, means for automatically guiding said perfect sheets to a plurality of receiving means, and control means adjacent said second mentioned advancing means and actuated by passing sheets for respectively actuating said counting means and said automatic guiding means.

10. In a machine for counting and stacking metal sheets, the combination of a table having a port opening downwardly therethrough, means below said port for receiving sheets passing therethrough and other means beyond said table for receiving sheets passing over said port, means adjacent said port for directing a given number of sheets respectively to the first mentioned receiving means and said other receiving means, means for counting said sheets, and means engaged by said sheets and having operative connection with said counting means and said directing means for actuating said counting means and said directing means.

11. In a machine for sorting, counting and stacking metal sheets, and having a plurality of inspection tables, a plurality of devices combined therewith and having manual controls to remotely control the rejection of imperfect sheets, a continuously operated means positioned between said tables and operating only on selected sheets to reverse the presented side of the sheets passing over said tables, means operable by said remote controls to reject imperfect sheets, said means preventing further progress of the imperfect sheets through said machine: the combination of a plurality of discharge depositors, means for counting perfect sheets passing through said machine, said counting means including means for directing a given number of such sheets to one of said discharge depositors and then directing the same predetermined number of sheets to another discharge depositor, and stacking means adjacent each discharge depositor to receive said discharged sheets and deposit them upon said depositors, said counting and directing means being actuated by the passage of perfect sheets to be counted.

12. In a machine for sorting, counting and stacking metal sheets having a plurality of inspection tables, a plurality of devices providing remote controls to reject imperfect sheets, one such device being associated with each inspection table, means positioned between said inspection tables for reversing the presented side of said sheets, said means comprising a plurality of radial arms secured to a plurality of collars, the corresponding arms of each collar being substantially in alinement, means to automatically reject imperfect sheets, said means comprising a continuously driven drum, a plurality of pins positioned adjacent the periphery thereof, said pins normally being in inoperative position, a plurality of means actuated by the beforementioned remote control to move said pins to an operative position, there being one of such actuating means for each said control and being positioned to actuate said pins in accordance with the location of said control relative to the sorting device, means operated by said pins in operative position to remove imperfect sheets from further progress through the machine, and means to return said pins to a normal inoperative position after actuating said rejecting mechanism: the combination of a plurality of discharge depositors, means for counting perfect sheets passing through the machine and including means for directing a predetermined number of sheets to one of said discharge depositors, said counting means comprising a plurality of interconnected levers actuated by the passage of said sheets, a plurality of interconnected dentate discs, one of said discs being actuated by one of said levers, and cam means mounted upon the other of said discs for actuating said directing means to change the direction of travel of the counted sheets to another of said discharge depositors, and a plurality of means to receive and stack the counted sheets discharged from the machine at said depositors, one of said means being provided adjacent each discharge depositor, each of said stacking means comprising a plurality of racks normally maintained in an inoperative position, continuously operated means for actuating said racks to bring the latter into sheet receiving position at desired intervals, said racks stacking the received sheets as the racks return to said inoperative position, and actuating means for causing the described cooperation of said parts.

WILLIAM E. TAYLOR.